United States Patent
Chiang et al.

(10) Patent No.: US 10,452,658 B2
(45) Date of Patent: Oct. 22, 2019

(54) CACHING METHODS AND A SYSTEM FOR ENTROPY-BASED CARDINALITY ESTIMATION

(71) Applicant: Teradata US, Inc., Dayton, OH (US)

(72) Inventors: Kuorong Chiang, Buena Park, CA (US); Chuchu Wu, Los Angeles, CA (US); Wei Tang, Rancho Palos Verdes, CA (US)

(73) Assignee: Teradata US, Inc., San Diego, CA (US)

( * ) Notice: Subject to any disclaimer, the term of this patent is extended or adjusted under 35 U.S.C. 154(b) by 957 days.

(21) Appl. No.: 14/581,797

(22) Filed: Dec. 23, 2014

(65) Prior Publication Data
US 2016/0179889 A1    Jun. 23, 2016

(51) Int. Cl.
*G06F 17/30* (2006.01)
*G06F 16/2453* (2019.01)

(52) U.S. Cl.
CPC .. *G06F 16/24539* (2019.01); *G06F 16/24545* (2019.01)

(58) Field of Classification Search
CPC ......... G06F 17/30463; G06F 17/30339; G06F 17/30457; G06F 17/3046
See application file for complete search history.

(56) References Cited

U.S. PATENT DOCUMENTS

| | | | |
|---|---|---|---|
| 5,544,355 A * | 8/1996 | Chaudhuri | ........ G06F 17/30463 |
| 2006/0074875 A1 | 4/2006 | Faunce et al. | |
| 2007/0016418 A1 | 1/2007 | Mehrotra | |
| 2008/0052269 A1* | 2/2008 | Abdo | ................ G06F 17/30469 |
| 2009/0216709 A1* | 8/2009 | Cheng | ............... G06F 17/30442 |

OTHER PUBLICATIONS

Markl et al. Consistently Estimating the Selectivity of Conjuncts of Predicates. Proceedings of the 31st VLDB Conference, Trondheim, Norway, 2005. Retrieved from the Internet <URL:https://courses.cs.washington.edu/courses/cse544/11wi/papers/markl-vldb-2005.pdf>.*

* cited by examiner

*Primary Examiner* — Apu M Mofiz
*Assistant Examiner* — Husam Turki Samara
(74) *Attorney, Agent, or Firm* — Schwegman, Lundberg & Woessner, P.A.; James Stover

(57) ABSTRACT

Query conditions are received in a cache from a query optimizer of a Database Management System (DBMS). Dynamic statistics for the query conditions are maintained in the cache. Actual statistics are received in the cache after the query conditions are executed in the DBMS. Entropy-based estimated selectivity values for executing the query conditions are provided to the query optimizer to develop a query plan for executing queries having the query conditions. The entropy-based estimated selectivity values based, at least in part, on the dynamic statistics and the actual statistics.

20 Claims, 8 Drawing Sheets

CACHING METHODS AND A SYSTEM FOR ENTROPY-BASED CARDINALITY ESTIMATION

BACKGROUND

Large-scale Database Management Systems (DBMSs) often include voluminous tables with numerous columns and rows that span those columns. The DBMSs can also be distributed across multiple servers. As a result, the ability to efficiently process a query against any of the DBMS tables involves a lot more than simply processing the query conditions defined by a user.

A query optimizer provides a mechanism for query efficiency and exists with most DBMSs. The query optimizer generates a query plan based on statistics generated for the DBMS, the tables, the rows, the columns, the partitions, the data that populated the DBMS, histories for processing queries and accessing tables, and for a variety of other aspects associated with the DBMS.

However, for large DBMS tables, it becomes very difficult and expensive to collect statistical information. Moreover, maintaining and analyzing this statistical information can be a resource nightmare for any enterprise having a DBMS.

Further, when a DBMS supports queries that include or integrate foreign objects or data external to the DBMS environment, such as Hadoop® tables, any statistics associated with those foreign objects or data is not available to the DBMS and correspondingly the query optimizer.

SUMMARY

In various embodiments, caching methods and a system for entropy-based cardinality estimation are presented. According to an embodiment, a method for caching and using entropy-based cardinality estimation is provided.

Specifically, a query condition on a column of a table is received in a cache. A determination is made as to whether a selectivity value for the query condition exists in the cache. The selectivity value and a total number of rows for the table are returned when the selectivity value exists in cache; otherwise an entropy-based estimated selectivity value for the query condition and an entropy-based estimated total number of rows in the table are returned.

DETAILED DESCRIPTION

It is to be noted that the techniques presented herein are implemented as executable instructions that are programmed in memory or non-transitory computer-readable storage media (or medium) for execution on one or more processing devices, each processing device having one or more processors, and each processor specifically configured to execute the executable instructions.

The techniques and system herein propose a new and novel caching approach for storing, maintaining, and analyzing metadata associate with historical query results. This is achieved by conducting cardinality estimation using entropy based estimation techniques.

The techniques are applied and directed to process single-column equality queries or multiple-column equality queries.

Figure 1:
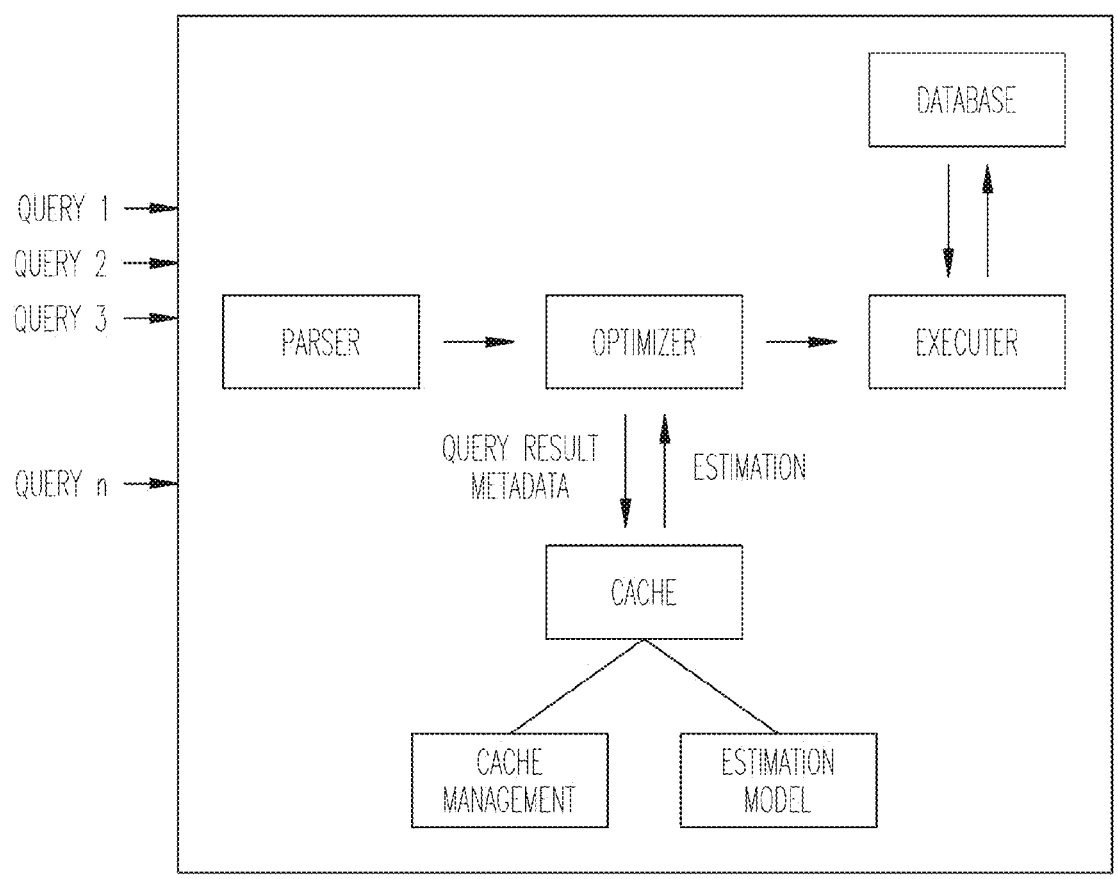
FIG. 1 is a diagram an architecture for query processing using a entropy-based cardinality estimation system, according to an example embodiment.

FIG. 1 is a diagram an architecture for query processing using a entropy-based cardinality estimation system, according to an example embodiment.

As queries arrive over time, without cardinality information of the underlying table, the DBMS query optimizer (hereinafter "optimizer") can do little to optimize the query processing plan. Hence, a cache system is added to store and analyze the historical query result metadata in order to estimate the table cardinality. The cache system includes three significant components: the cache itself, cache management, and an estimation model. The cache stores historical query metadata. The cache management application decides which queries are to be stored and which queries are to be discarded, as well as a technique for merging and compressing stored information, since the cache will have a limited size but the amount of information will keep increasing over time. The estimation model is built to estimate the cardinality according to the information obtained by analyzing historical query result metadata. The techniques use entropy based cardinality estimation approaches. The estimation model is revised and calibrated over time.

The system works using the following process:
When a query enters the system, the optimizer hands over the query condition to the cache system.
The estimation model in the cache system computes an estimated number of rows for the query (cardinality information), and provides the estimation results back to the optimizer.

The optimizer generates the query plan based on the estimation result, and passes the plan to the query executer (herein after "executor") for query execution.

After execution, the optimizer receives the true statistics obtained from executing the query, and feeds the query result metadata back to the cache system.

The estimation model is revised by combining the new information (the query result metadata).

The cache management algorithm decides whether to store the new information into the cache, discard it, merge it, etc.

When a new query enters the system, the same process repeats; however, the estimation model is revised based on previous queries, which provides a more accurate estimation.

Evaluation Metrics

The entropy, denoted H, for a distribution (which can be thought of as a column from a table; so, the terms "column" and "distribution" are used interchangeably herein) X is defined as:

$$H(X) = -\sum_{i=1}^{n} p_i(x) \times \log_2 p_i(x)$$

where n is the number of distinct values in column X and $p_i(x)$ is the probability (or selectivity) of the i th value on column X; $\log_2$ is the log function of base 2. Log is used with the understanding that it is base 2 herein and below.

The entropy of a column X can be viewed as the expected information obtained from a given value of X. The information associated with any value x is defined as:

$$I = -\log p(x).$$

For example, if $p(x)=\frac{1}{2}$, then I=1 (the unit of information is a bit) and $p(x)=\frac{1}{4}$, then I=2.

Use of Entropy to Estimate Selectivity

The selectivity of a value is the ratio of the number of rows corresponding to this value over the total number of rows in the table. It is feasible to assume that the total number of rows in the table is known. In order to predict the number of rows corresponding to a certain queried value, estimating the selectivity is needed.

When the selectivity of all values are the same, i.e. the selectivity is uniformly distributed, the entropy H is maximized and equal to log(n), where n is the number of values. And the selectivity is simply 1/n, i.e. $(\frac{1}{2})^H$. Since we do not know the number of values in the table, we use $(\frac{1}{2})^H$ to estimate the selectivity.

Estimation Algorithm

Whenever a query comes, the cache is inspected to see if the value exists. If it exists, return the corresponding number of rows (or selectivity); otherwise, return the estimated selectivity $(\frac{1}{2})^H$, and the estimated number of rows is $N \times (\frac{1}{2})^H$, where N is the total number of rows in the table.

Cold Start Problem and Solution

Initially when the cache is empty, or the cache has very few records stored, the current entropy-based estimation encounters a large error—currently the entropy H is initially set to 0 and increases over time as queries are executed. The error decreases over time as more and more information is obtained.

One solution to solve the cold start problem is to assume there are 10 virtual initial values in the table, and entropy H is log (10) instead of 0 initially. Hence, the initial estimated selectivity is 10% instead of 100%, which matches the some commercial DBMSs' default selectivity for equality queries when table statistics are not available. It is demonstrated by the simulations that follow that the estimation error in the initial phase is significant less than before.

10 virtual values are abandoned when the system obtains enough true information. Several abandon thresholds are tested, and finally the virtual values are abandoned when the selectivity reaches 90%. At this point, the selectivity detected refers to the summation of the selectivity of values for historical queries.

It is to be noted that 10 virtual values are just presented as on possible scenario. In fact, any percentage based number can be obtained to achieve acceptable results to the cold start problem. Therefore, the techniques herein are not to be restricted to 10 virtual values and the virtual values are a configurable parameter to the processing discussed herein.

Cache Management Application/Algorithm

When cache capacity is smaller than the actual number of unique values, the cache is managed according to the following process:

If the query sequence number (i.e. the number of queries that have been processed since the system started) is smaller than 2*capacity, entropy is updated with the selectivity of the "new value" (it is possible to be an old value previously noted but not in the cache). For example, when the cache capacity is 50 and sequence number is less than 100, the entropy is updated.

If the sequence number is larger than 2*capacity, entropy is updated with a probability of (capacity/sequence). For example, when the cache capacity is 50 and sequence number is larger than 100, say 124, then the entropy is updated with probability 50/124. The reason is that as more queries are processed, the is a higher chance that a new-incoming query is one that has been processed before, even if it is not stored in cache, since the cache size is limited. If the new-incoming query is actually an "old" one, it does not provide any new information towards the computation of entropy. Hence, the probability of updating the entropy is gradually decreased as more and more queries are processed.

Before the cache is full, the new value is always inserted.

After the cache is full, an importance factor is calculated: $(s_i - \bar{s})^2 \times c$ for each record in the cache. The importance factor shows how incorrectly each value is predicted (estimation error $(s_i - \bar{s})^2$), and how often the value is queried (i.e. c). The higher the estimation error is, the more there is a necessity to keep the cache in order to reduce future estimation errors; and the more frequently a value is queried, the more likely it is that the value will be queried again in the future (i.e. popular values), thus popular values are kept in cache. The value with the smallest importance factor is found in the cache, and compare with the new incoming value. The "less important" value is eliminated.

Updates to the entropy of the cache occur as well (e.g., when a value is removed, added, etc.).

Trial Simulation and Results

A cache system as described above was implemented. The cache system stores historical query result metadata, estimates selectivity using entropy-based approach and performs cache management. A variety of table data distributions and query distributions were tested. The simulation specifications can be summarized in the table that follows. Table data distribution refers to the selectivity distribution in the very large/foreign table (table external to the DBMS) and reflects how skewed the data is; query distribution refers to the probability that each values are queried, i.e. the popularity distribution, or "data temperature."

| | |
|---|---|
| Table data distribution | Uniform/Normal/Exponential/Power-law |
| Query distribution | Unbiased/Power-law |
| Cache size | 50/Infinite |
| 10 virtual initial value used | Enabled/Disabled |

The FIGS. 2-5 that follow show the diagrams of estimation error, which varies over time as more queries are processed. Among the four types of table data distributions, uniform data distribution has the least skew, whereas power-law distribution has the most skew. From the FIGS. 2-5 it is demonstrated that the estimation error always decreases exponentially over time, and works better for less skewed data.

Figure 2:
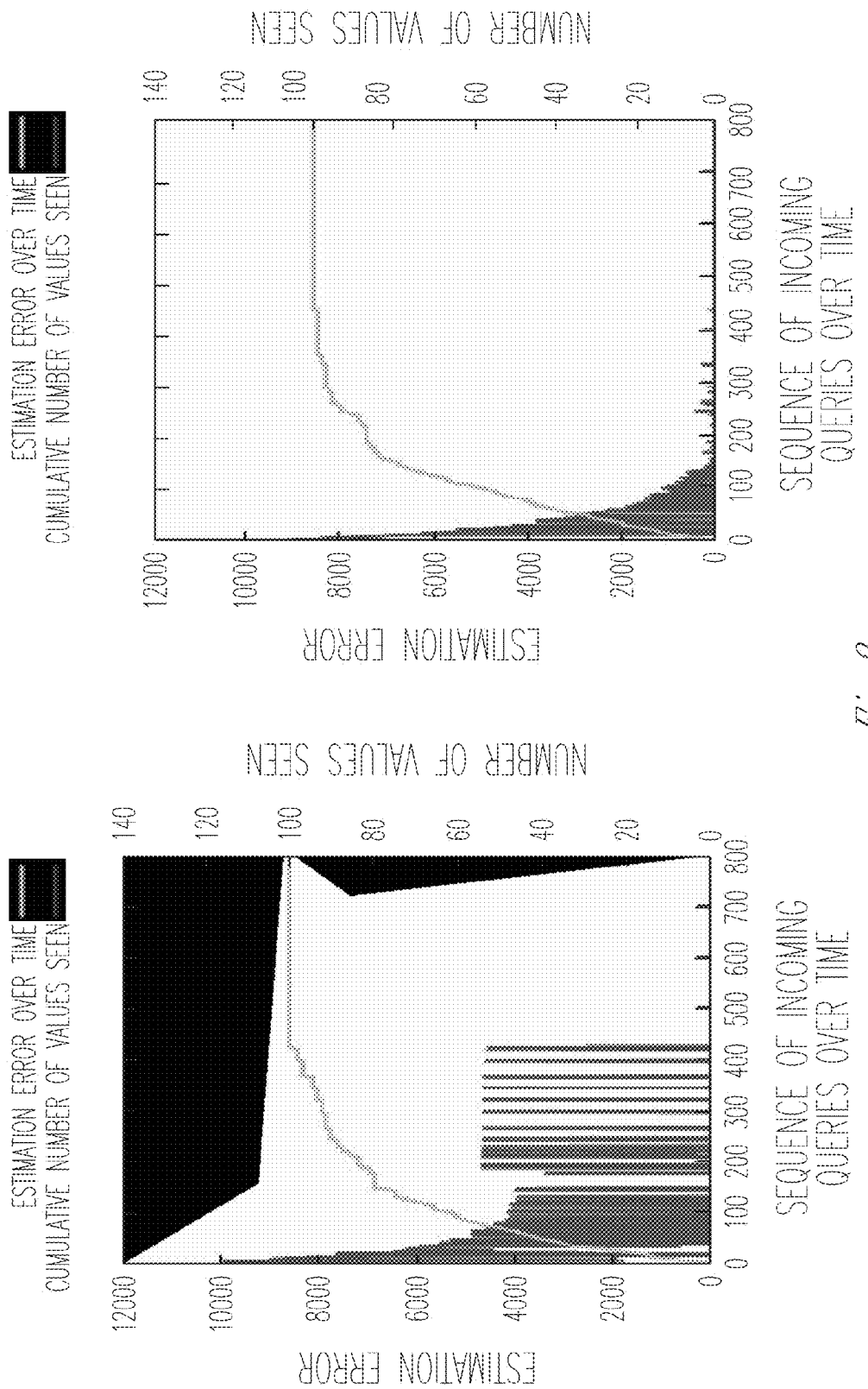
FIG. 2 depicts diagrams of graphs depicting for estimation of error over time on a uniform data distribution (left diagram) and on a power-law data distribution (right diagram) with the query distribution unbiased, the cache size infinite, and a 10-virtual value enabled, according to an example embodiment.

FIG. 2 depicts diagrams of graphs depicting for estimation of error over time on a uniform data distribution (left diagram) and on a power-law data distribution (right diagram) with the query distribution unbiased, the cache size infinite, and a 10-virtual value enabled, according to an example embodiment.

The two diagrams deploy unbiased query distribution.

Figure 3:
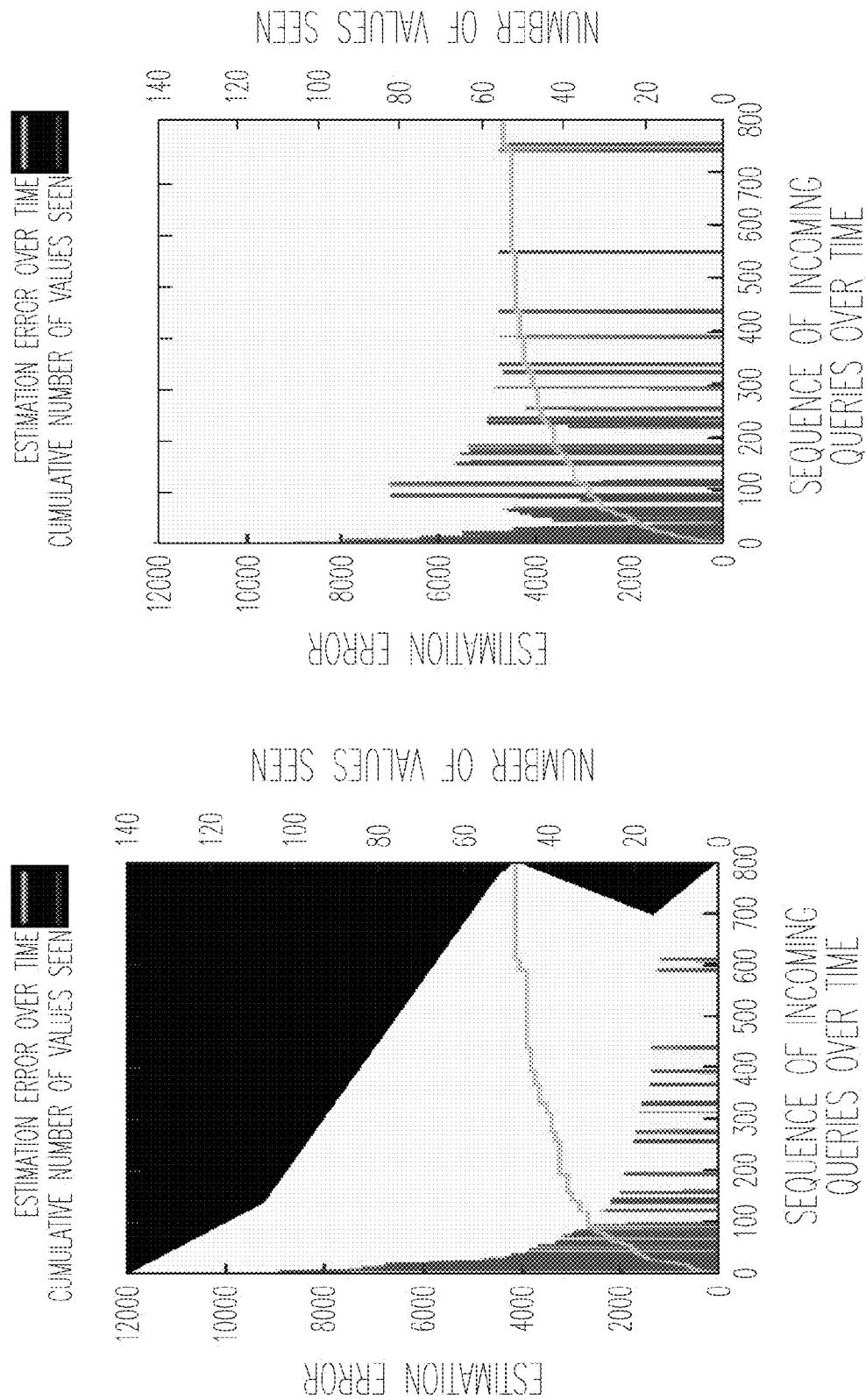
FIG. 3 depicts diagrams of graphs for estimation of error over time on a uniform data distribution (left diagram) and on a power-law data distribution (right diagram) with the query distribution equal to power-law, the cache size infinite, and a 10-virtual value enabled, according to an example embodiment.

FIG. 3 depicts diagrams of graphs for estimation of error over time on a uniform data distribution (left diagram) and on a power-law data distribution (right diagram) with the query distribution equal to power-law, the cache size infinite, and a 10-virtual value enabled, according to an example embodiment.

The FIG. 3 shows how query distribution affects the estimation by changing the query distribution to power-law distribution where high selectivity values have much larger probability of being queried than low selectivity values.

From the FIG. 3 it is demonstrated that when query distribution is highly biased (some values are frequently queried whereas others are more ignored), the number 0-error cases increases, because the cache stores popular values; whereas the estimation error for values not in the cache is larger than before, because less total information is obtained since the same values appear again and again, providing little fresh information to calibrate the estimation model. Comparing between uniform and power-law data distribution, the less skewed distribution still provides less estimation error. However, since less total number of values are seen in case of unbiased query distribution, the 10 virtual values play a more important role than before; furthermore, they are never abandoned because the total selectivity seen never reaches the threshold (90%).

Figure 4:
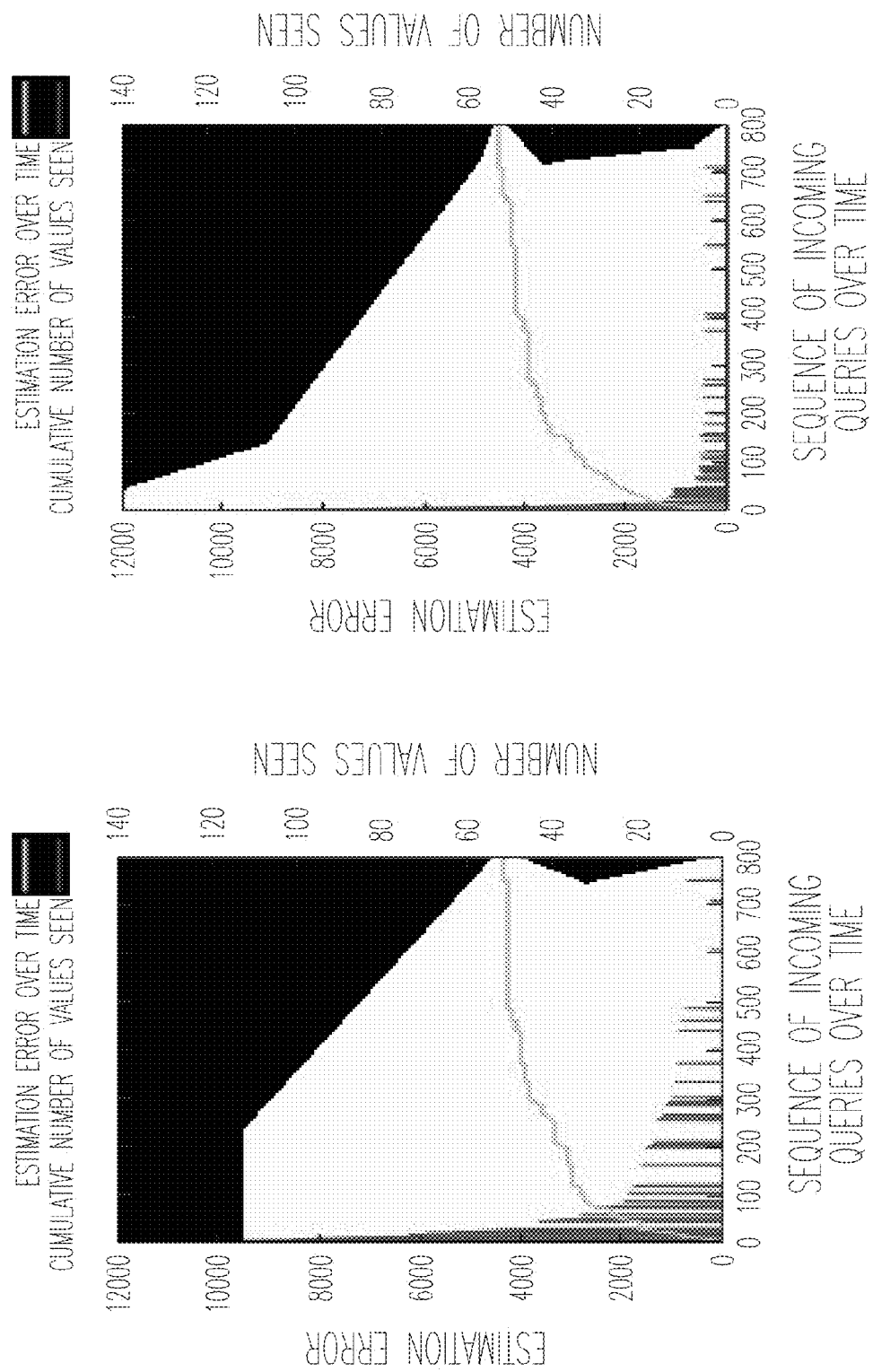
FIG. 4 depicts diagrams of graphs for estimation of error over time on a uniform data distribution (left diagram) and on a power-law data distribution (right diagram) with the query distribution equal to power-law, the cache size infinite, and a 10-virtual value disabled, according to an example embodiment.

FIG. 4 depicts diagrams of graphs for estimation of error over time on a uniform data distribution (left diagram) and on a power-law data distribution (right diagram) with the query distribution equal to power-law, the cache size infinite, and a 10-virtual value disabled, according to an example embodiment.

If we disable the 10 virtual values from the beginning, results are received as shown in the FIG. 4, where more skewed data distribution has less estimation error in the long run, although of course it suffers from cold start problem (the estimation error in the beginning phase is much larger than using 10 virtual values). This happens because without 10 virtual values, the estimation is prone to be larger, which happens to match the case where large selectivity values are generally the ones being queried.

Figure 5:
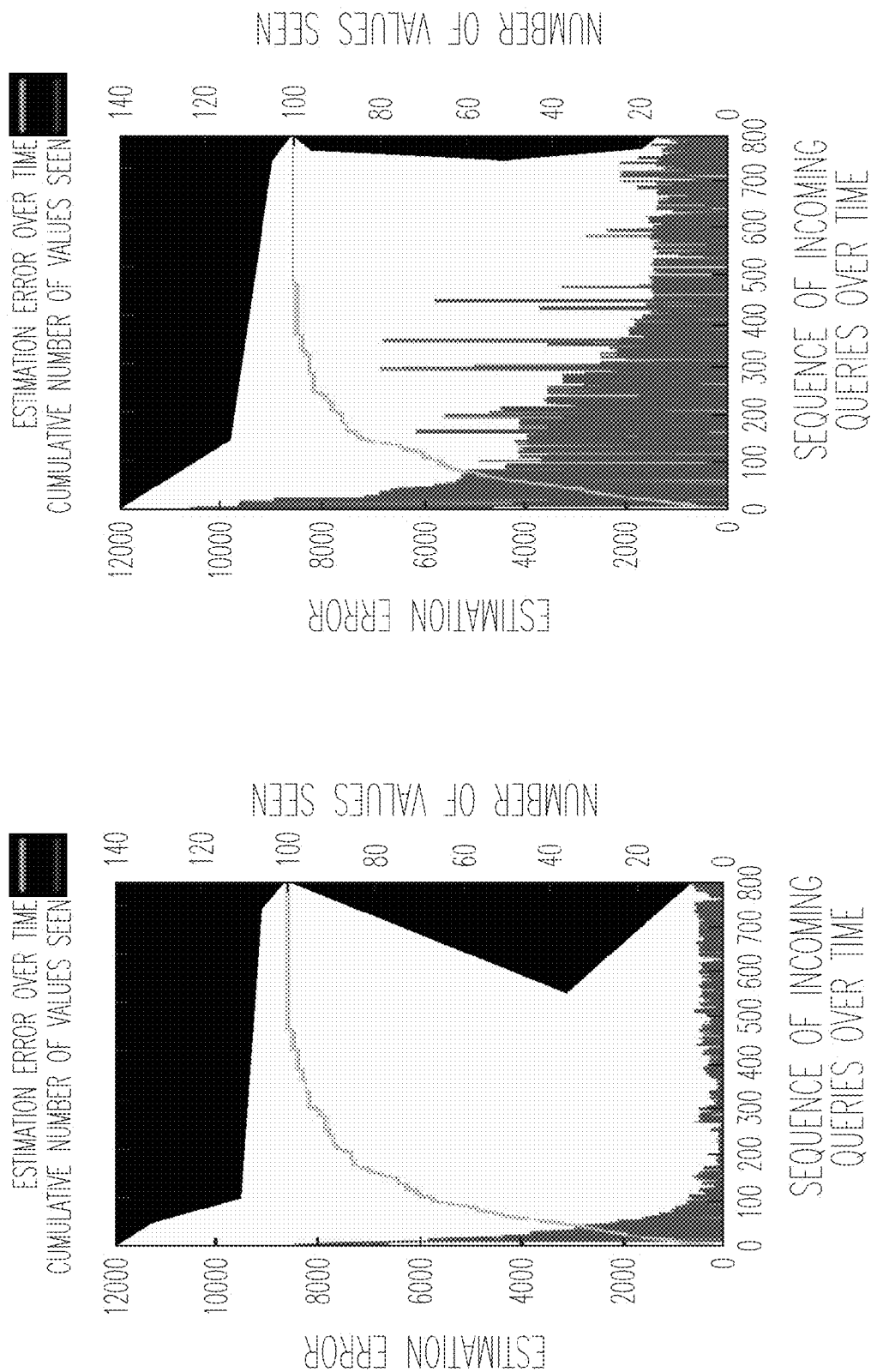
FIG. 5 depicts diagrams of graphs for estimation of error over time on a uniform data distribution (left diagram) and on a power-law data distribution (right diagram) with the query distribution unbiased, the cache size equal to 50, and a 10-virtual value enabled, according to an example embodiment.

FIG. 5 depicts diagrams of graphs for estimation of error over time on a uniform data distribution (left diagram) and on a power-law data distribution (right diagram) with the query distribution unbiased, the cache size equal to 50, and a 10-virtual value enabled, according to an example embodiment.

The FIG. 5 shows the estimation error diagram when the cache size is reduced to 50, which is 50% of total number of values. The estimation error is generally larger than the case of inifite cache, and it affects the skewed data more. This is because with less cache size, the estimation relies more on the estimation model other than the cache itself, and skewed data is less accurately modeled than uniform data.

The techniques and the system discussed above with reference to the FIGS. 1-5 demonstrate that when a DBMS works on foreign objects, it converts the foreign table to a DBMS table format in order to operate over it. For the statistics component of the resulting DBMS table, it is usually left blank. By deploying the proposed cache system that learns table statistic from historical queries over time, the information can be added to the statistics component of the resulting DBMS table, and modified over time.

Also for huge (very large) tables where statistics are very expensive to collect and maintain, the techniques presented use the estimation from the cache system to assist in query plan optimization for the optimizer.

The proposed techniques and system have a sound theoretical foundation based on entropy, which is a well-studied concept and has been successfully applied in many areas.

Moreover the proposed techniques and system are easily integrated into DBMSs. The changes are minimal and computation overhead is very small.

Furthermore, the proposed techniques and system save significant amounts of cost spent on huge table statistics collection and maintenance.

Figure 6:
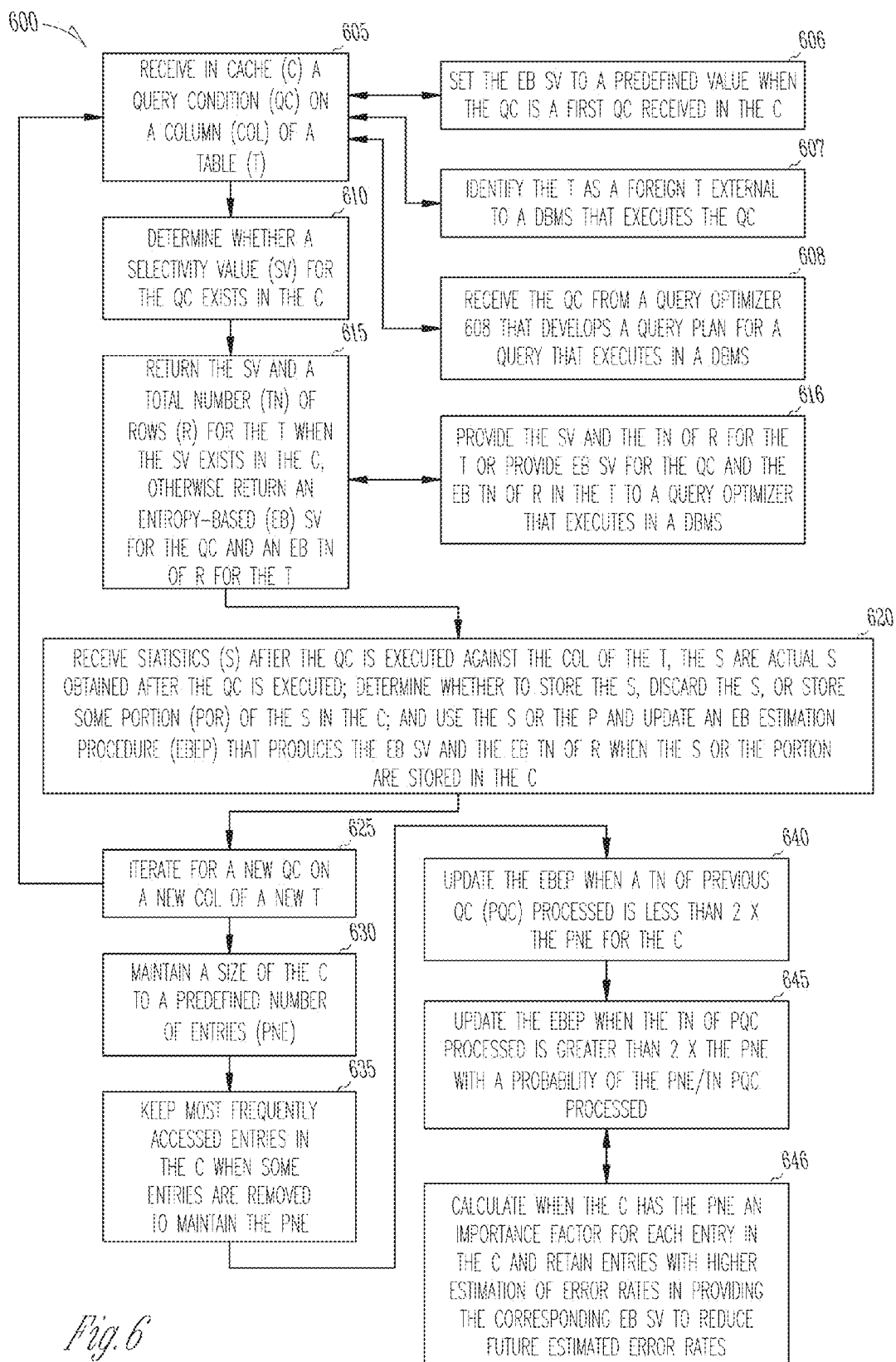
FIG. 6 is a diagram of a method for improving query processing through a caching technique with entropy-based cardinality estimation, according to an example embodiment.
Figure 7:
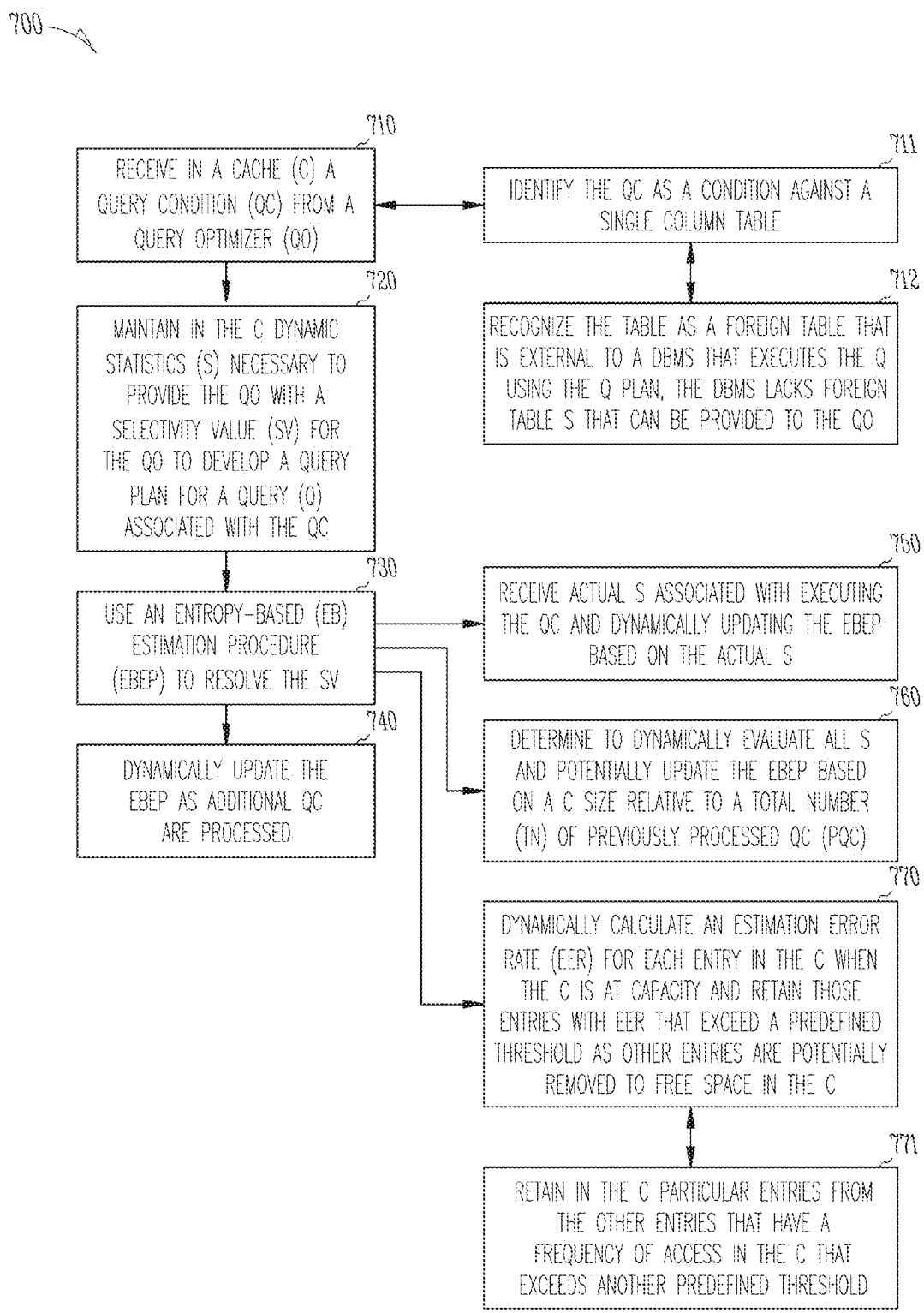
FIG. 7 is a diagram of another method for improving query processing through a caching technique with entropy-based cardinality estimation, according to an example embodiment.
Figure 8:
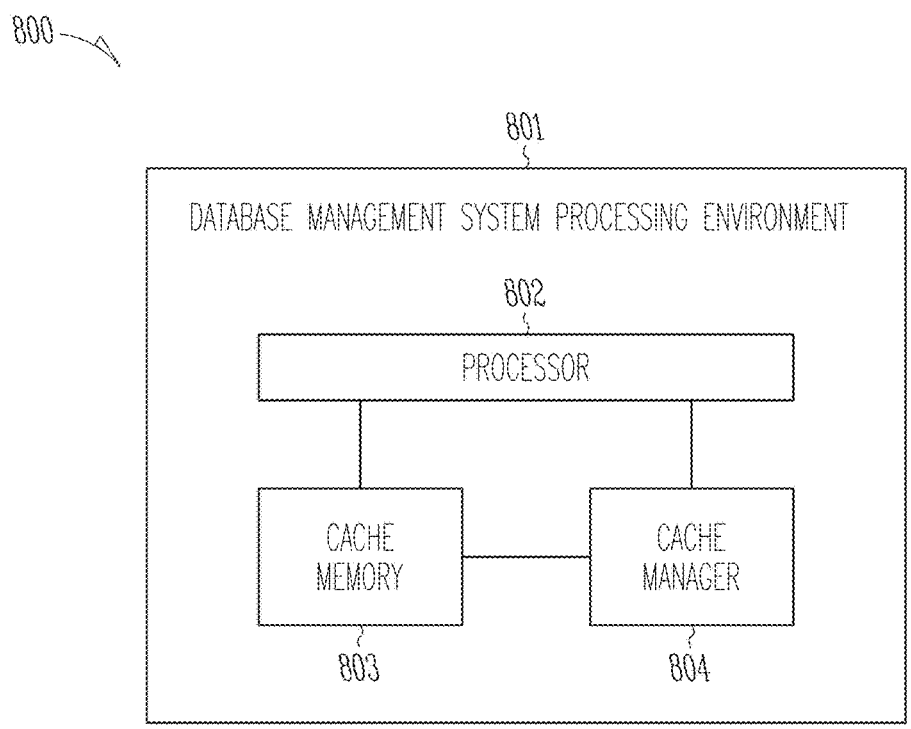
FIG. 8 is a diagram of a cache entropy-based cardinality estimation system, according to an example embodiment.

These embodiments and other embodiments are now further presented with reference to the FIGS. 6-8.

FIG. 6 is a diagram of a method 600 for improving query processing through a caching technique with entropy-based cardinality estimation, according to an example embodiment. The method 600 (hereinafter "cache-based selectivity estimation manager") is implemented as executable instructions that are programmed and reside within memory and/or non-transitory computer-readable storage media for execution on one or more processing nodes (processors) of a network; the network wired, wireless, and/or a combination of wired and wireless.

The processor that executes the cache-based selectivity estimation manager is part of a distributed parallel processing environment and architecture.

In an embodiment, the distributed parallel processing environment is a massively parallel distributed Relational Database Management System (RDBMS).

In an embodiment, the processor that executes the cache-based cardinality manager is part of a DBMS.

In an embodiment, the cache-based selectivity estimation manager implements, inter alia, at least some of the processing discussed above with respect to the FIGS. 1-5.

At 605, the cache-based selectivity estimation manager receives in cache memory (cache) a query condition on a column of a table.

According to an embodiment, at 606, the cache-based selectivity estimation manager sets the entropy-based estimated selectivity value (discussed above with respect to the FIGS. 1-5 and below at 615) to a predefined value when the query condition is the first query condition received in the cache. This can be the virtual values discussed in the FIGS. 1-5, which are set, in an embodiment, to 10 virtual values.

In an embodiment, at 607, the cache-based selectivity estimation manager identifies the table as a foreign table external to a DBMS that executes the query condition on the column of the table.

In an embodiment, at 608, the cache-based selectivity estimation manager receives the query condition from a query optimizer that develops a query plan for a query that executes in a DBMS.

At 610, the cache-based selectivity estimation manager determines whether a selectively value for the query condition exists in the cache.

At 615, the cache-based selectivity estimation manager returns the selectively value and a total number of rows for the table when the selectivity value exists in the cache; otherwise, the cache-based selectivity estimation manager returns an entropy-based estimated selectivity value and an entropy-based estimated total number of rows for the table.

In an embodiment, at 616, the cache-based selectivity estimation manager provides the selectivity value and the total number of rows for the table or provides the entropy-based estimated selectivity for the query condition and the entropy-based estimated total number of rows in the table to the query optimizer that executes in a DBMS.

According to an embodiment, at 620, the cache-based selectivity estimation manager receives statistics after the query condition is executed against the column of the table. The statistics are actual statistics obtained after the query condition is executed. The cache-based selectivity estimation manager also determines whether to store the statistics, discard the statistics, or store some portion of the statistics in the cache. Moreover, the cache-based selectivity estimation manager uses the statistics or a portion of the statistics and updates an entropy-based estimation procedure that produces the entropy-based estimated selectivity value and the entropy-based estimated total number of rows when the statistics or the portion of the statistics are stored in the cache.

In an embodiment of 620 and at 625, the cache-based selectivity estimation manager iterates processing back to 605 for new query conditions on a new column of a new table.

In an embodiment of 625 and at 630, the cache-based selectivity estimation manager maintains a size of the cache to a predefined number of entries (maintains a pre-determined cache max size).

In an embodiment of 630 and at 635, the cache-based selectivity estimation manager keeps the most frequently accessed entries in the cache when some entries are removed to maintain the cache size. This was discussed above in the FIGS. 1-5 as popular values or entries in the cache.

In an embodiment of 635 and at 640, the cache-based selectivity estimation manager updates the entropy-based estimation procedure when a total number of previous query conditions processed are less than two times the cache max size. As discussed above, the query conditions are associated with queries being processed and have a query sequence number such that in an embodiment the sequence number of the most recent query condition can be used to resolve the total number of previous query conditions processed in the cache.

In an embodiment of 640 and at 645, the cache-based selectivity estimation manager updates the entropy-based estimation procedure when the total number of previous query conditions processed is greater than two times the predefined number of entries (cache max size) with a probability represented by the cache max size divided by the total number of previous query conditions processed.

In an embodiment of 645 and at 646, the cache-based selectivity estimation manager calculates when the cache is at cache max size, an importance factor for each entry in the cache and retains entries with higher estimation of error rates when the cache-based selectivity estimation manager provided the corresponding entropy-based estimated selectivity values. This is done (as discussed above in the FIGS. 1-5) to reduce future estimated error rates.

FIG. 7 is a diagram of another method 700 for improving query processing through a caching technique with entropy-based cardinality estimation, according to an example embodiment. The method 700 (hereinafter "cache statistics manager") is implemented as executable instructions within memory and/or non-transitory computer-readable storage media that execute on one or more processors of a device, the processors specifically configured to execute the cache statistics manager. The cache statistics manager is also operational over a network; the network is wired, wireless, or a combination of wired and wireless.

The cache statistics manager is part of a distributed parallel distributed processing environment and architecture.

In an embodiment, the distributed parallel processing environment is a massively parallel distributed RDBMS.

In an embodiment, the cache statistics manager is part of a DBMS processing environment.

In an embodiment, the cache statistics manager implements, inter alia, at least some of the processing discussed above with respect to the FIGS. 1-5.

In an embodiment, the cache statistics manager presents another and enhanced processing perspective of the FIG. 6.

At 710, the cache statistics manager receives, in a cache, a query condition from a query optimizer.

In an embodiment, at 711, the cache statistics manager identifies the query condition as a condition against a single column table.

In an embodiment of 711 and at 712, the cache statistics manager recognizes the table as a foreign table that is external to a DBMS that executes the query using the query plan. The DBMS lacks foreign table statistics that can be provided to the query optimizer.

At 720, the cache statistics manager maintains in the cache dynamic statistics (changing and updated statistics over time) necessary to provide the query optimizer with a selectivity value for the query optimizer to develop a query plan for a query associated with the query condition.

At 730, the cache statistics manager uses an entropy-based estimation procedure to resolve the selectivity value. This procedure was discussed at length with examples above with respect to the discussion of the FIGS. 1-5.

According to an embodiment, at 740, the cache statistics manager dynamically updates the entropy-based estimation procedure as additional query conditions are processed over time.

In an embodiment, at 750, the cache statistics manager receives actual statistics associated with execution the query condition and dynamically updates the entropy-based estimation procedure based on the actual statistics.

In an embodiment, at 760, the cache statistics manager determines to dynamically evaluate all statistics and potentially update the entropy-based estimation procedure based on a cache size relative to a total number of previously processed query conditions.

In an embodiment, at 770, the cache statistics manager dynamically calculates an estimation error rate for each entry in the cache when the cache is at capacity and retains those entries with estimated error rates that exceed a predefined threshold as other entries are potentially removed to free space in the cache.

In an embodiment of 770 and at 771, the cache statistics manager retains in the cache particular entries from the other entries that have a frequency of access in the cache that exceeds another predefined threshold.

FIG. 8 is a diagram of a cache entropy-based cardinality estimation system 800, according to an example embodiment. Some components of the cache entropy-based cardinality estimation system 800 are implemented as executable instructions that are programmed and reside within memory and/or non-transitory computer-readable storage medium that execute on one or more processors of a network. The network is wired, wireless, or a combination of wired and wireless.

In an embodiment, cache entropy-based cardinality estimation system 800 implements, inter alia, the techniques presented above with respect to the discussions relevant to the FIGS. 1-5.

In an embodiment, the cache entropy-based cardinality estimation system 800 implements, inter alia, the techniques presented above with the method 600 of the FIG. 6.

In an embodiment, the cache entropy-based cardinality estimation system 800 implements, inter alia, the techniques presented above with the method 700 of the FIG. 7.

In an embodiment, the cache entropy-based cardinality estimation system 800 implements, inter alia, the techniques presented above with the methods 600 of the FIG. 6 and the methods 700 of the FIG. 7.

The cache entropy-based cardinality estimation system 800 includes a DBMS processing environment 801 having at least one processor 802, a cache memory 803, and a cache manager 804.

In an embodiment, the DBMS 801 is part of a Relational Database Management System (RDBMS).

The cache manager 804 is configured to: execute on the at least one processor 802, manage the cache memory (cache) 803, provides a query optimizer with an entropy-based estimated selectivity value for query conditions by using statistics retained in the cache 803 and by using actual statistics received after the query conditions are executed within the DBMS processing environment 801.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
(a) maintaining, in a cache, historical query result metadata;
(b) receiving, in the cache, a query condition on a column of a table;
(c) determining whether a selectivity value for the query condition exists in the cache; and
(d) returning the selectivity value and a total number of rows for the table when the selectivity value exists in cache otherwise returning an entropy-based estimated selectivity value for the query condition and an entropy-based estimated total number of rows in the table;
(e) receiving, in said cache, additional query result metadata, after the query condition is executed against the column of the table, the additional query result metadata being actual values obtained after the query condition is executed;
(f) determining whether to store the additional query result metadata, discard the additional query result metadata, or store some portion of the additional query result metadata in the cache; and
(g) using the additional query result metadata or the portion of the additional query result metadata and updating an entropy-based estimation procedure that produces the entropy-based estimated selectivity value and the entropy-based estimated total number of rows when the statistics or the portion of the statistics are stored in the cache.

2. The method of claim 1 further comprising, (h) repeating (b)-(g) for a new query condition on a new column of a new table.

3. The method of claim 2 further comprising, (i) maintaining a size of the cache to a predefined number of entries.

4. The method of claim 3 further comprising, (i) keeping most frequently accessed entries in the cache when some of the entries are removed to maintain the predefined number of entries.

5. The method of claim 4 further comprising, (k) updating the entropy-based estimation procedure when a total number of previous query conditions processed is less than two times the predefined number of entries for the cache.

6. The method of claim 5 further comprising, (l) updating the entropy-based estimation procedure when the total number of previous query conditions processed is greater than two times the predefined number of entries for the cache with a probability of the predefined number of entries divided by the total number of previous query conditions processed.

7. The method of claim 6 further comprising, (m) calculating, when the cache has the predefined number of entries, an importance factor for each entry in the cache and retaining entries with higher estimation of error rates in providing the corresponding entropy-based estimated selectivity value to reduce future estimation error rates.

8. The method of claim 1, wherein (b) further includes setting the entry-based estimated selectivity value to a predefined value when the query condition is a first query condition received in the cache.

9. The method of claim 1, wherein (b) further includes identifying the table as a foreign table external to a Database Management System that executes the query condition.

10. The method of claim 1, wherein (b) further includes receiving the query condition from a query optimizer that develops a query plan for executing a query having the query condition in a Database Management System (DBMS).

11. The method of claim 1, wherein (d) further includes providing the selectivity value and a total number of rows for the table or the entropy-based estimated selectivity value for the query condition and the entropy-based estimated total number of rows in the table to a query optimizer that executes in a Database Management System (DBMS).

12. A method, comprising:
receiving, in a cache, a query condition from a query optimizer;
maintaining, in the cache, historical query result metadata including statistics for providing the query optimizer with a selectivity value for the query optimizer to develop a query plan for a query associated with the query condition;
using, in the cache, an entropy-based estimation procedure to resolve the selectivity value;

providing, from the cache, the selectivity value to the query optimizer; and receiving additional query result metadata associated with executing the query condition and dynamically updating the entropy-based estimation procedure based on the actual statistics.

13. The method of claim 12 further comprising, dynamically update the entropy-based estimation procedure as additional query conditions are processed.

14. The method of claim 12 further comprising, determining to dynamically evaluate all statistics and potentially dynamically updating the entropy-based estimation procedure based on a cache size relative to a total number of previously processed query conditions.

15. The method of claim 12 further comprising, dynamically calculating an estimation error rate for each entry in the cache when the cache is at capacity and retaining those entries with estimation error rates that exceed a predefined threshold as other entries are potentially removed to fee free space in the cache.

16. The method of claim 15, wherein dynamically calculating further includes retaining, in cache, particular entries from the other entries that have a frequency of access in the cache that exceeds another predefined threshold.

17. The method of claim 12, wherein receiving further includes identifying the query condition as a condition against a single column of a table.

18. The method of claim 17, wherein identifying further includes recognizing the table as a foreign table that is external to a Database Management System (DBMS) that executes the query using the query plan provided from the query optimizer, the DBMS lacks foreign table statistics that can be provided to the query optimizer.

19. A system, comprising:
a processor;
a cache memory containing historical query result metadata; and
a cache manager configured to: i) execute on the processor, ii) manage the cache memory, and iii) provide a query optimizer with an entropy-based estimated selectivity value for query conditions by using statistics retained in the cache memory historical query result metadata and by using actual statistics received after the query conditions are executed.

20. The system of claim 19, wherein the system is integrated into a Database Management System (DBMS).

* * * * *